(12) United States Patent
Crawford et al.

(10) Patent No.: US 11,047,723 B1
(45) Date of Patent: Jun. 29, 2021

(54) APPARATUS AND METHOD FOR MEASURING FLUID FLOW PARAMETERS

(71) Applicants: Joshua Earl Crawford, Odessa, TX (US); Joe Earl Crawford, Crane, TX (US)

(72) Inventors: Joshua Earl Crawford, Odessa, TX (US); Joe Earl Crawford, Crane, TX (US)

( * ) Notice: Subject to any disclaimer, the term of this patent is extended or adjusted under 35 U.S.C. 154(b) by 0 days.

(21) Appl. No.: 16/249,379

(22) Filed: Jan. 16, 2019

Related U.S. Application Data

(63) Continuation-in-part of application No. 15/247,778, filed on Aug. 25, 2016, now abandoned.

(51) Int. Cl.
*G01F 1/86* (2006.01)
*G01K 1/14* (2021.01)

(52) U.S. Cl.
CPC ............... *G01F 1/86* (2013.01); *G01K 1/14* (2013.01)

(58) Field of Classification Search
CPC ........ E21B 47/06; E21B 47/065; E21B 47/10; E21B 2049/085; G01N 33/0036; G01N 33/241; G01F 1/86; G01K 1/14
See application file for complete search history.

(56) References Cited

U.S. PATENT DOCUMENTS

| | | | | |
|---|---|---|---|---|
| 4,195,520 A | * | 4/1980 | Shaver | G01F 1/00 73/215 |
| 5,040,415 A | * | 8/1991 | Barkhoudarian | G01P 5/245 73/198 |
| 5,646,354 A | | 7/1997 | Lovejoy | |
| 5,920,829 A | * | 7/1999 | Bretmersky | G05D 7/0635 702/50 |
| 2003/0056952 A1 | * | 3/2003 | Stegemeier | E21B 43/00 166/250.12 |
| 2005/0166683 A1 | * | 8/2005 | Krivitski | G01F 1/704 73/861.05 |
| 2005/0183515 A1 | * | 8/2005 | DeLong | E21B 47/10 73/861.63 |
| 2008/0234939 A1 | | 9/2008 | Foot et al. | |
| 2009/0084177 A1 | * | 4/2009 | Ao | G01F 1/684 73/170.12 |
| 2011/0114132 A1 | | 5/2011 | Padtberg et al. | |
| 2015/0000378 A1 | * | 1/2015 | Kent | G01N 15/0826 73/38 |
| 2016/0091357 A1 | * | 3/2016 | Hedtke | G01S 13/88 342/124 |
| 2016/0161462 A1 | | 6/2016 | Lyer et al. | |
| 2017/0212065 A1 | * | 7/2017 | Rud | G01N 25/18 |

* cited by examiner

*Primary Examiner* — Mischita L Henson
(74) *Attorney, Agent, or Firm* — Rao DeBoer Osterrieder, PLLC; Dileep P. Rao

(57) ABSTRACT

An apparatus and a method for measuring fluid flow parameters. The apparatus can have a plurality of upstream sensors and a plurality of downstream sensors in communication with a computer. By comparing the sensor reading to an ambient condition, or a known fluid characteristic, the presence of fluid can be determined. The computer can utilize measured data from the sensors and known sensor placement to calculate volumetric flow rate and make determinations about equipment health.

7 Claims, 4 Drawing Sheets

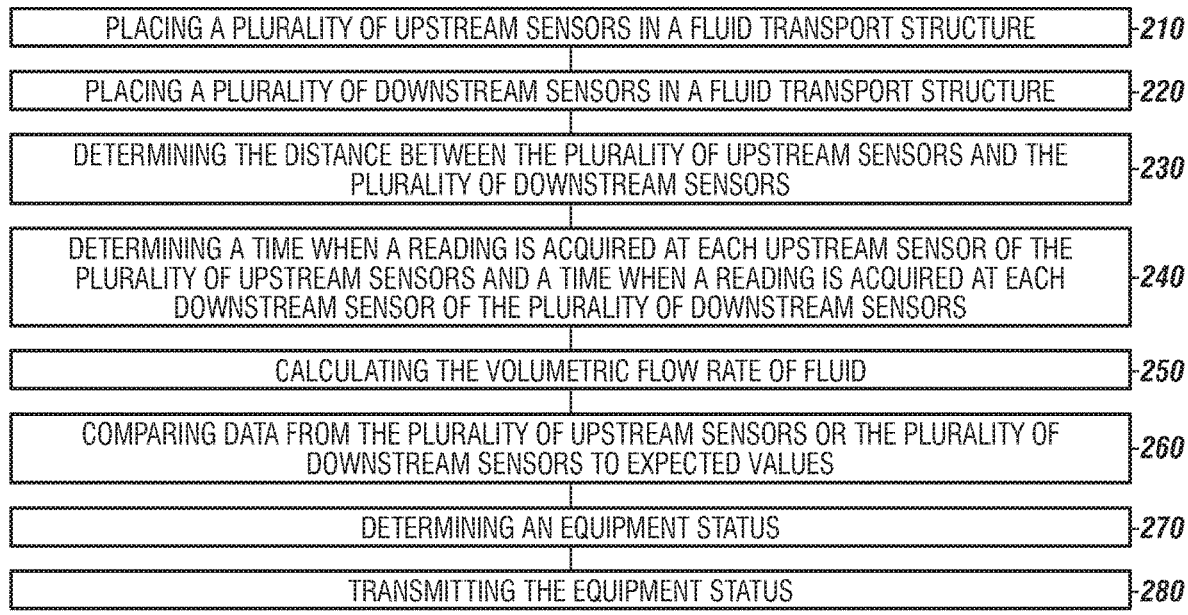

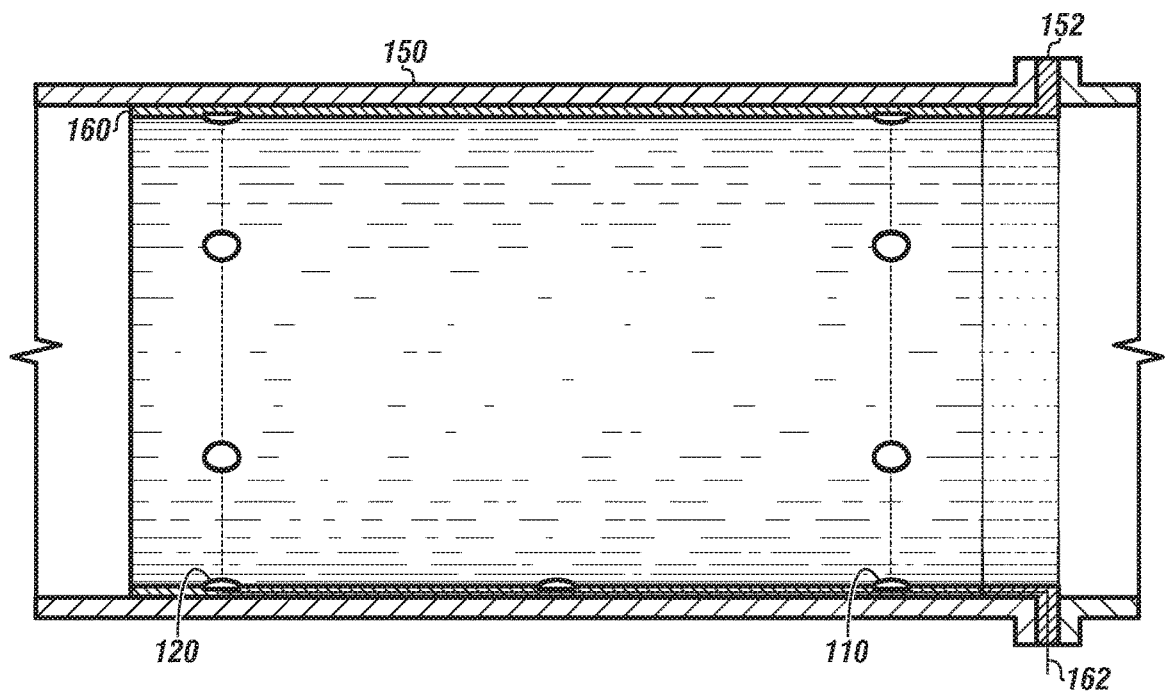
FIGURE 5A
FIGURE 5B
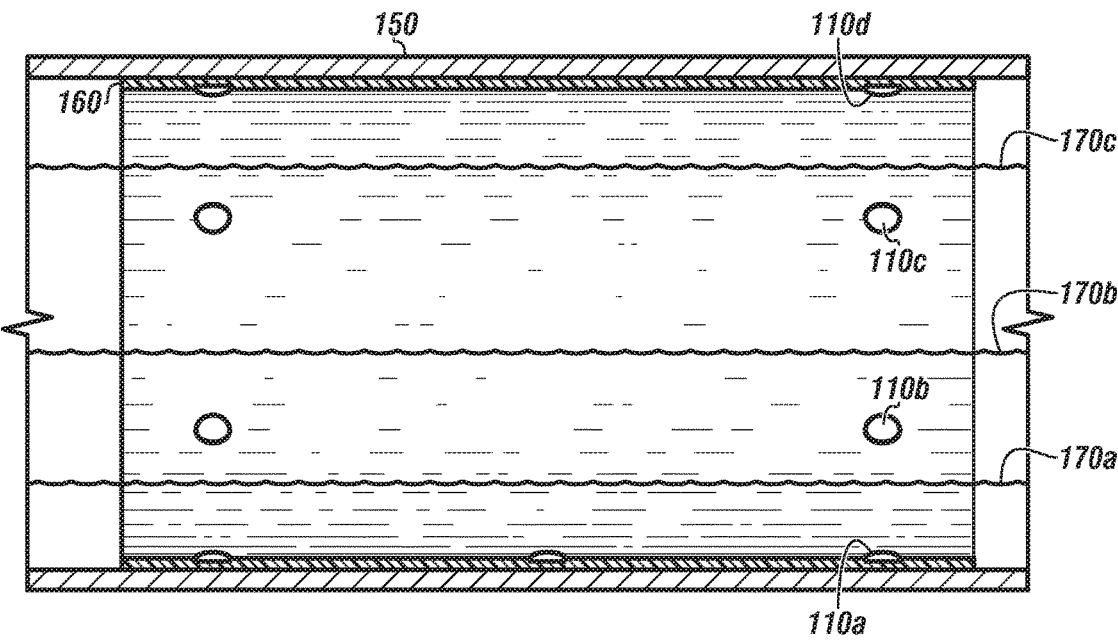

APPARATUS AND METHOD FOR MEASURING FLUID FLOW PARAMETERS

CROSS REFERENCE TO RELATED APPLICATION

The current application is a Continuation in Part and claims priority to and the benefit of co-pending U.S. Nonprovisional patent application Ser. No. 15/247,778 filed on Aug. 25, 2016, titled "APPARATUS AND METHOD FOR MEASURING FLUID FLOW PARAMETERS", which claims benefit to U.S. Provisional Patent Application Ser. No. 62/209,985 filed Aug. 26, 2015, titled "METHOD AND APPARATUS TO MEASURE PARAMETERS TO DETERMINE FUNCTIONAL STATUS OF PUMP OR SIMILAR DEVICE". These references are hereby incorporated herein in their entirety.

FIELD

The present embodiments generally relate to an apparatus and a method for measuring fluid flow rates.

BACKGROUND

Various industrial processes require information regarding flow rates and other parameters in various pipes, hoses, or other fluid transportation structures. Typically, mechanical means of measurement have been utilized which present maintenance and mechanical failure issues.

Typical mechanical flow rate measurement devices currently used can include devices such as piston meters, gear meters, variable area meters, turbine flow meters, paddle wheel meters, and the like.

While these devices provide necessary data to control and monitor various processes, they all contain mechanisms with moving parts which require regular maintenance and are susceptible to failure.

Further, these devices can interfere with the actual fluid flow by causing turbulence or undesired pressure drops across the device.

A need exists for an apparatus and a method for determining fluid flow rates (as well as other fluid parameters) which is reliable, requires minimal maintenance, and has a long operational life.

A further need exists for a scalable device capable of adapting to multiple sizes of fluid transportation structures.

The present embodiments meet these needs.

BRIEF DESCRIPTION OF THE DRAWINGS

The detailed description will be better understood in conjunction with the accompanying drawings as follows:

FIG. 2 depicts a method for measuring and determining fluid flow parameters according to one or more embodiments.

FIGS. 5A and 5B depict the apparatus of the present disclosure according to one or more embodiments.

Figure 1:
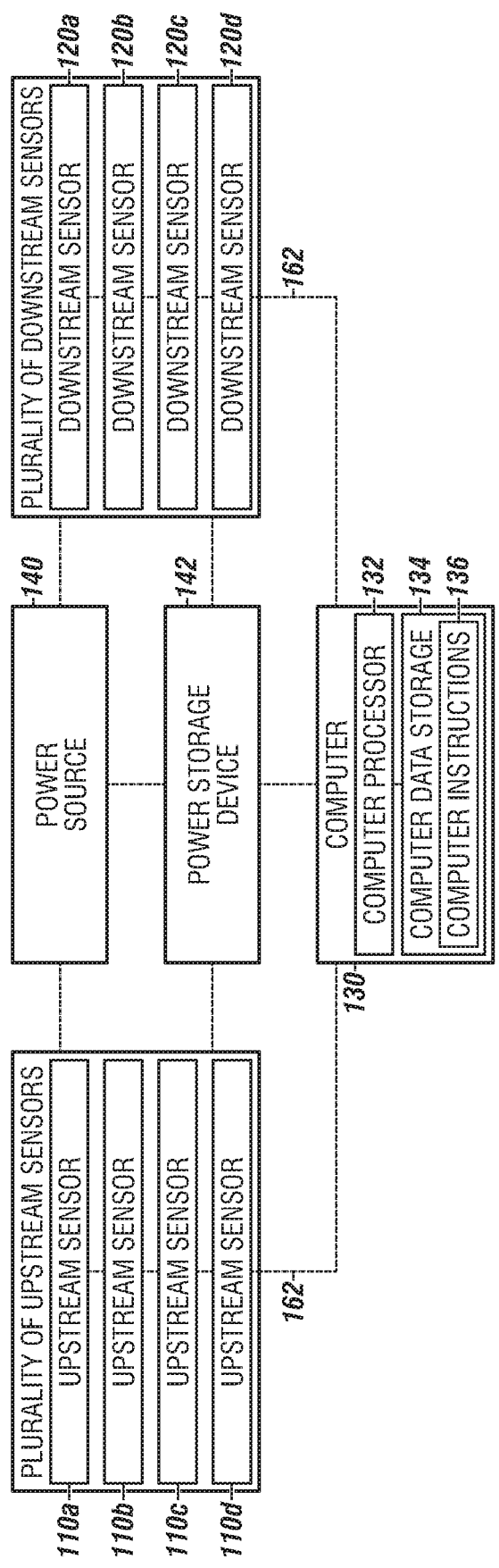
FIG. 1 depicts a schematic representation of an apparatus for measuring and determining fluid flow parameters according to one or more embodiments.

The present embodiments are detailed below with reference to the listed Figures.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about" means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The present embodiments generally relate to an apparatus and a method for measuring fluid flow parameters.

The present embodiments allow for flow measurements to be taken with minimal flow disturbance. Further, the present embodiments have no mechanical moving parts for measuring fluid flow rates. Various fluid parameters can be measured, calculated and extrapolated using the present invention. This allows for rigorous measurement of fluid parameters, as well the ability to assess equipment function and potentially predict upset conditions.

In embodiments, the apparatus comprises a plurality of upstream sensors and a plurality of downstream sensors. For the sake of clarity, temperature sensors will be referred to in the following description for exemplary reasons. However, persons having ordinary skill in the art can substitute various sensors, such as pressure transducers, radioactivity detectors, or sensors for any other measurable fluid parameter. Exemplary sensors can include sonar sensors, thermal sensors, proximity sensors, optical/laser sensors, ultrasonic sensors, and the like.

Selection of the sensor can be specific to the application requirements and the desired data to be monitored and collected.

Any fluid flow pathway with known dimensions which are typically used to transport fluids can utilize the apparatus of the present disclosure, such as a pipe, a trough, and the like.

Each sensor of the plurality of upstream sensors and the plurality of downstream sensors can be in electronic communication with each other, as well as a computer. The computer can comprise a computer processor and computer data storage.

The term computer can be any computer known in the art, such as a personal computer, a laptop, a tablet computer, a smart or cellular phone, or similar device capable of bidirectional communication. In embodiments, the computer can be connected, either in wired or wireless communication with a network.

The term "data storage" or "computer data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

In embodiments, the data storage can comprise a plurality of computer instructions for instructing the computer processor to perform various functions and calculations.

Computer instructions stored within the computer data storage can instruct the computer processor to: determine which upstream sensor of the plurality of upstream sensors is in contact with fluid, determine which downstream sensor of the plurality of downstream sensors is in contact with fluid, calculate a time for fluid travel from the plurality of upstream sensors to the plurality of downstream sensors, calculate a volumetric flow rate of fluid, compare the volumetric flow rate of fluid to an expected flow rate of fluid, determine an equipment status, transmit the equipment status, determine a change in fluid temperature, recalculate a volumetric flow rate in response to the change in fluid temperature, and determine when maintenance is required.

In one exemplary embodiment, a plurality of temperature sensors can be deployed within a pipe or other fluid transportation structure, such as, a hose, a channel, and the like.

For horizontal pipe, the plurality of temperature sensors can be deployed at various heights, in order to determine the level of fluid within the pipe. Each of the temperature sensors can be in electronic communication with each other, as well as a computer.

A plurality of upstream temperature sensors can be placed at a known distance away from the plurality of downstream temperature sensors. The computer can collect data from each of the sensors to measure fluid parameters or perform calculations and determine fluid parameters.

For example, with known sensor placement in horizontal pipe, a fluid level within the pipe can be determined by establishing which sensors provide temperature readings in an expected range. Knowing the size and capacity of the pipe, the volume of a fluid can be instantaneously calculated at an upstream sensor position. By comparing the time that readings are acquired at upstream sensors vs downstream sensors, a volumetric flow rate can be calculated for the fluid.

In the instance where temperature sensors are utilized, a change in temperature above a predetermined threshold can trigger a recalculation of fluid flow rates.

Further, the calculated flow rate can be compared to an expected flow rate to determine whether there is a leak or other malfunction. For example, a drastic reduction in flow rate combined with an increase in fluid temperature can indicate that a pump is dead-heading. A decrease in flow rates as compared to historical rates can indicate that there is a leak within the system.

Further, readings outside an expected range for one or more sensors can indicate that maintenance is necessary for either a piece of equipment related to fluid flow, or the sensor itself.

In embodiments, a power source, such as a solar cell can be in communication with a power storage device, such as a battery, as well as in communication with the computer and the sensors. This can allow for unattended operation of the apparatus for long periods of time.

In various embodiments, the computer can transmit information to another system.

The other system can include but is not limited to: a distributed control system, a maintenance device, a supervisory control and data acquisition (SCADA) system, an alarm system, and the like.

Persons having ordinary skill in the art can determine types of sensors and sensor positions based upon the specific application.

In embodiments, the apparatus can be designed as a pipe fitting with the sensors placed in known locations and at known distances. Other embodiments can include a biasing mechanism, such as a spring, a sleeve, or an expandable mesh, to extend sensors after insertion into a fluid transportation structure, such as a pipe. For other fluid conveyances, such as a trough, for example, other arrangements of the apparatus can be used by persons having ordinary skill in the art.

The apparatus can be made to a specific pipe size when known or designed to extend to a maximum diameter to scale to an unknown pipe size. Any known means of electronic communication can be utilized for the apparatus.

The present embodiments also include a method for measuring and determining fluid flow parameters.

The method can involve placing a plurality of upstream sensors in a fluid transport structure, placing a plurality of downstream sensors in a fluid transport structure, determining the distance between the plurality of upstream sensors and the plurality of downstream sensors, determining a time when a reading is acquired at each upstream sensor of the plurality of upstream sensors and a time when a reading is acquired at each downstream sensor of the plurality of downstream sensors, calculating a volumetric flow rate of fluid, comparing data from the plurality of upstream sensors or the plurality of downstream sensors to expected values, determining an equipment status, and transmitting the equipment status.

Turning now to the Figures, FIG. 1 depicts a schematic representation of an apparatus for measuring and determining fluid flow parameters according to one or more embodiments.

The apparatus can have a plurality of upstream sensors 110a-110d and a plurality of downstream sensors 120a-120d. In embodiments, the sensors can be in communication with each other and with a computer 130. The means of communication 162 can be wired or wireless as desired for a specific application.

In embodiments, the computer 130 can have a computer processor 132 and computer data storage 134. The computer data storage 134 can comprise a plurality of computer instructions 136.

In embodiments, a power source 140 can also be in communication with a power storage device 142, such as a battery, as well as the other components.

FIG. 2 depicts a method for measuring and determining fluid flow parameters according to one or more embodiments.

The method can include placing a plurality of upstream sensors in a fluid transport structure, illustrated in box 210.

The method can include placing a plurality of downstream sensors in a fluid transport structure, illustrated in box 220.

The method can include determining the distance between the plurality of upstream sensors and the plurality of downstream sensors, illustrated in box 230.

The method can include determining a time when a reading is acquired at each upstream sensor of the plurality of upstream sensors and a time when a reading is acquired at each downstream sensor of the plurality of downstream sensors, illustrated in box 240.

The method can include calculating a volumetric flow rate of fluid, illustrated in box 250.

The method can include comparing data from the plurality of upstream sensors or the plurality of downstream sensors to expected values, illustrated in box 260.

The method can include determining an equipment status, illustrated in box 270.

The method can include transmitting the equipment status, illustrated in box 280.

Figure 3A:
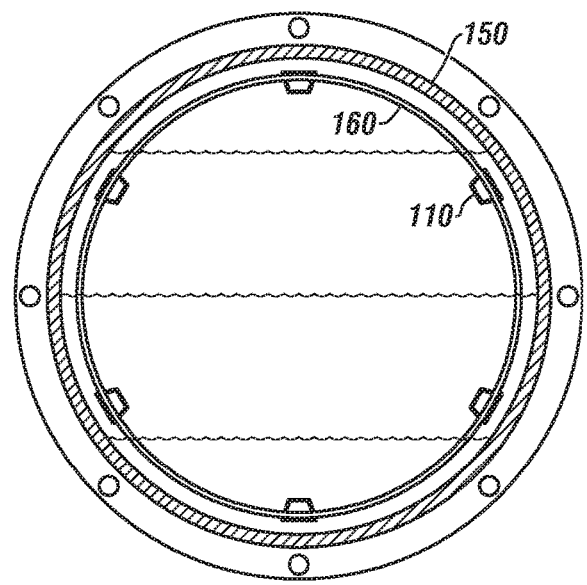
FIGS. 3A and 3B depict an embodiment of the apparatus of the present disclosure according to one or more embodiments.
Figure 3B:
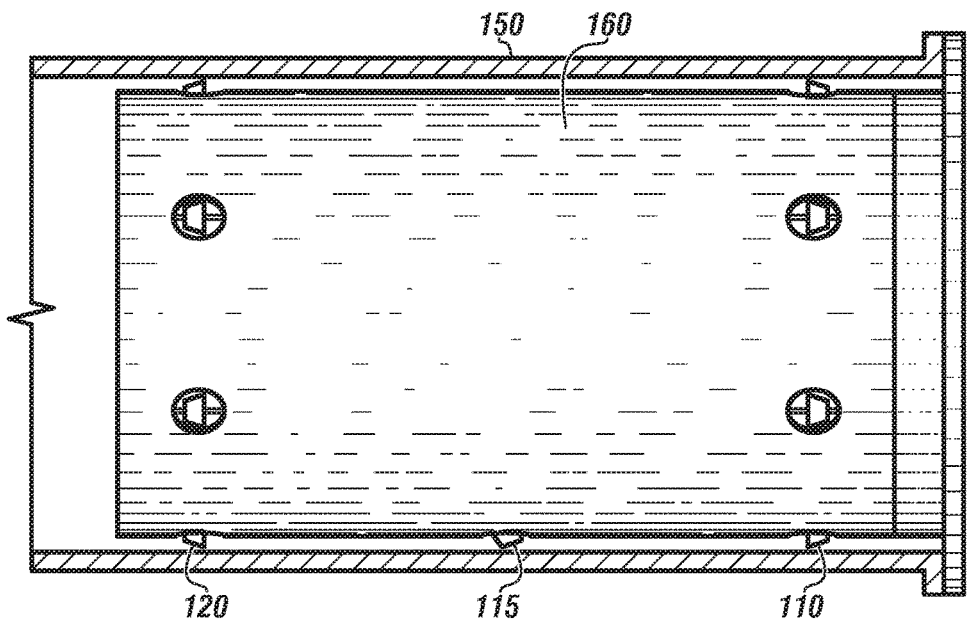

FIGS. 3A and 3B depict the apparatus of the present disclosure according to one or more embodiments.

In embodiments, the apparatus can comprise a sleeve or mesh 160 to orient and/or place the upstream sensors 110 and downstream sensors 120 within a fluid flow pathway 150, such as a pipe.

As can be seen from the side view, sensor 115 is upstream to sensor 120, but downstream to sensor 110. Sensor 115, therefore can function as both an upstream and a downstream sensor in the embodiment shown.

The presence of fluid can be determined in various ways based upon the specific application. For example, if a temperature sensor is being used, any deviation of temperature from an ambient, known temperature can indicate the presence of fluid. In embodiments, when a fluid temperature is known, a sensor reading the known temperature can indicate the presence of fluid. In embodiments, a pressure reading that varies from atmospheric pressure can indicate the presence of fluid.

Therefore, persons having ordinary skill in the art can determine based upon the sensor utilized, whether the sensor reading varies from an ambient condition (i.e. no fluid) or matches the known characteristic of the fluid to determine the presence of fluid.

By knowing the precise distance from sensor 110 to sensor 115, or sensor 110 to sensor 120, fluid flow speed can be calculated. By knowing the cross-sectional area of the fluid flow pathway, a fluid flow volume can be calculated.

Figure 4:
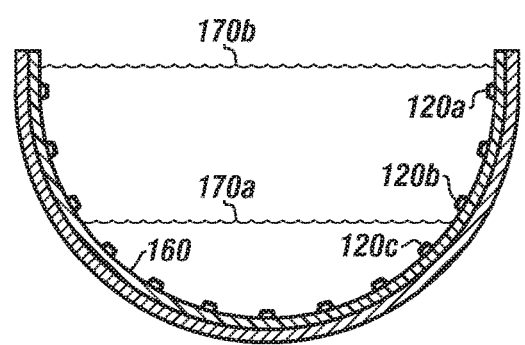
FIG. 4 depicts the apparatus of the present disclosure as used in a trough, or half pipe according to one or more embodiments.

FIG. 4 depicts the apparatus of the present disclosure as used in a trough, or half pipe according to one or more embodiments.

Sleeve or mesh 160 orients and places a number of sensors 120a-120c. By knowing the precise placement of sensors 120a-120c, an accurate volumetric calculation can be made. For example, if fluid flows at fluid level 170a, then sensor 120c will read a characteristic varying from ambient, or the known fluid characteristic. Similarly, if the fluid flows at fluid level 170a, then sensor 120b will read an ambient characteristic, or will not read the known fluid characteristic. The fluid level within the fluid flow pathway, and therefore the cross-sectional area, can be accurately determine for the purposes of volumetric calculations.

Similarly, if the reading from sensor 120a indicates the presence of fluid, then the fluid flows at fluid level 170b and the full cross-sectional area of the fluid flow pathway can be utilized for volumetric calculations. Based upon the desired accuracy, fewer or greater number of sensors can be utilized by persons having ordinary skill in the art.

Since the position of the sensors is known, any necessary calculations can account for what data is used, and from which sensor the data is acquired. The presence of fluid can also be determined at any given sensor.

FIGS. 5A and 5B depict the apparatus of the present disclosure according to one or more embodiments.

A sleeve 160 is shown here within the fluid flow pathway 150. Sleeve 160, in this embodiment, is held in place at a flange or connection point 152. Based upon readings at sensors 110a-110d fluid levels 170a-170c can be determined as described above.

While these embodiments have been described with emphasis on the figures, it should be understood that within the scope of the appended claims, the embodiments might be practiced other than as specifically described herein.

What is claimed is:

1. An apparatus for measuring and determining fluid flow parameters comprising:
   a) a plurality of upstream sensors in electronic communication with at least one other upstream sensor of the plurality of upstream sensors placed at various heights in a fluid flow pathway, wherein at least one upstream sensor of the plurality of upstream sensors is a temperature sensor;
   b) a plurality of downstream sensors in electronic communication with at least one other downstream sensor of the plurality of downstream sensors placed at various heights in a fluid flow pathway, wherein at least one downstream sensor of the plurality of downstream sensors is a temperature sensor;
   c) a known distance between the plurality of upstream sensors and the plurality of downstream sensors;
   d) a computer in communication with the plurality of upstream sensors and the plurality of downstream sensors, wherein the computer comprises a computer processor and a computer data storage; and
   e) computer instructions stored within the computer data storage instructing the computer processor to:
      i) determine which upstream sensor of the plurality of upstream sensors is in contact with fluid;
      ii) determine which downstream sensor of the plurality of downstream sensors is in contact with the fluid;
      iii) calculate a time for the fluid to travel from the plurality of upstream sensors to the plurality of downstream sensors; and iv) calculate a volumetric flow rate of the fluid by determining the level of fluid within the fluid flow pathway based upon which sensor provides a reading within the fluid flow pathway and utilizing the time for fluid to travel from the plurality of upstream sensors to the plurality of downstream sensors; and wherein the plurality of upstream sensors and the plurality of downstream sensors are placed within or adjacent to a wall of the fluid flow pathway such that the plurality of upstream sensors and the plurality of downstream sensors do not create any appreciable obstruction to fluid flow.

2. The apparatus of claim 1, further comprising computer instructions stored within the computer data storage instructing the computer processor to:
   a) compare the volumetric flow rate of the fluid to an expected flow rate of the fluid;
   b) determine an equipment status; and
   c) transmit the equipment status.

3. The apparatus of claim 2, further comprising computer instructions stored within the computer data storage instructing the computer processor to:
   a) determine a change in fluid temperature; and
   b) recalculate the volumetric flow rate in response to the change in the fluid temperature.

4. The apparatus of claim 1, further comprising a power source and a power storage device, each in electronic communication with the computer, the plurality of upstream sensors, and the plurality of downstream sensors.

5. The apparatus of claim 1, further comprising computer instructions stored within the computer data storage instructing the computer processor to determine when maintenance is required.

6. A method for measuring and determining fluid flow parameters comprising:

a) placing a plurality of upstream sensors at various heights in a fluid transport structure adjacent a wall of the fluid transport structure of known size, wherein at least one upstream sensor of the plurality of upstream sensors is a temperature sensor;
   b) placing a plurality of downstream sensors at various heights in the fluid transport structure adjacent a wall of the fluid transport structure of known size, wherein at least one downstream sensor of the plurality of downstream sensors is a temperature sensor;
   c) determining a distance between the plurality of upstream sensors and the plurality of downstream sensors;
   d) determining a time when a reading is acquired at each upstream sensor of the plurality of upstream sensors and a time when a reading is acquired at each downstream sensor of the plurality of downstream sensors; and
   e) calculating a volumetric flow rate of fluid by determining the fluid level within the fluid transport structure based upon which sensor provides a reading and when the sensor provides a reading; and wherein the plurality of upstream sensors and the plurality of downstream sensors are placed within or adjacent to a wall of the fluid flow pathway such that the plurality of upstream sensors and the plurality of downstream sensors do not create any appreciable obstruction to fluid flow.

7. The method of claim 6, further comprising:
   a) comparing data from the plurality of upstream sensors or the plurality of downstream sensors to expected values;
   b) determining an equipment status; and
   c) transmitting the equipment status.

* * * * *